United States Patent [19]

Haruzono

[11] Patent Number: 5,402,804

[45] Date of Patent: Apr. 4, 1995

[54] TOBACCO HARVERTER

[75] Inventor: Teruo Haruzono, Kagoshima, Japan

[73] Assignee: Japan Tobacco, Inc., Tokyo, Japan

[21] Appl. No.: 953,914

[22] Filed: Sep. 30, 1992

[30] Foreign Application Priority Data

Feb. 6, 1992 [JP] Japan .................................. 4-021113

[51] Int. Cl.$^6$ ......................... A24B 1/00; A01D 45/16
[52] U.S. Cl. .................................... 131/290; 131/313; 56/27.5
[58] Field of Search ................. 131/290, 313; 56/27.5, 56/330; 414/26

[56] References Cited

U.S. PATENT DOCUMENTS

| | | |
|---|---|---|
| 2,816,411 | 12/1957 | Wilson . |
| 3,603,064 | 9/1971 | Pinkham . |
| 3,731,475 | 5/1973 | Balthes . |
| 3,962,850 | 6/1976 | Moore ................................. 56/27.5 |
| 4,003,192 | 1/1977 | Jordan et al. . |
| 4,192,124 | 3/1980 | Balthes . |
| 4,332,128 | 6/1982 | Prince ................................. 56/27.5 |
| 4,391,084 | 7/1983 | Wilson ................................ 56/27.5 |
| 4,715,170 | 12/1987 | Miki .................................... 56/27.5 |
| 4,730,721 | 3/1988 | Demaiter et al. . |

FOREIGN PATENT DOCUMENTS

| | | |
|---|---|---|
| 2562757 | 10/1985 | France . |
| 2-174607 | 7/1990 | Japan . |
| 380015 | 4/1991 | Japan . |
| 3-251113 | 11/1991 | Japan . |
| 4-112704 | 4/1992 | Japan . |
| 4-112718 | 4/1992 | Japan . |
| 449915 | 4/1992 | Japan . |
| 449916 | 4/1992 | Japan . |

Primary Examiner—Jennifer Bahr

[57] ABSTRACT

A tobacco harvester for automatically harvesting only tobacco leaves in which leaf stripping claws of leaf stripping chains descend along a stem of a tobacco plant to strip down the tobacco leaves and transporting conveyors transport the tobacco leaves to a storage section. The tobacco harvester according to the present invention having a movable main body; a harvesting mechanism mounted on the main body for harvesting tobacco leaves while the main body travels. The harvesting mechanism having a pair of leaf transporting mechanisms which oppose each other with a clearance through which a stem of a tobacco plant passes, the leaf transporting mechanisms arranged on right and left sides of the main body and having leaf transporting rollers and endless conveyor belts disposed below the leaf transporting rollers which oppose each other and travel transversely to the main body, and leaf stripping chains disposed above and opposing the pair of leaf transporting mechanisms. The end of the leaf stripping chains on a front portion side of the main body being higher than the end on the rear portion side. The leaf stripping chains having leaf stripping claws which project from the leaf stripping chains and travel in the reverse direction to that of the main body at portions opposing the leaf transporting mechanisms; and a storage section mounted on the main body for storing the tobacco leaves harvested by the harvesting mechanism.

6 Claims, 7 Drawing Sheets

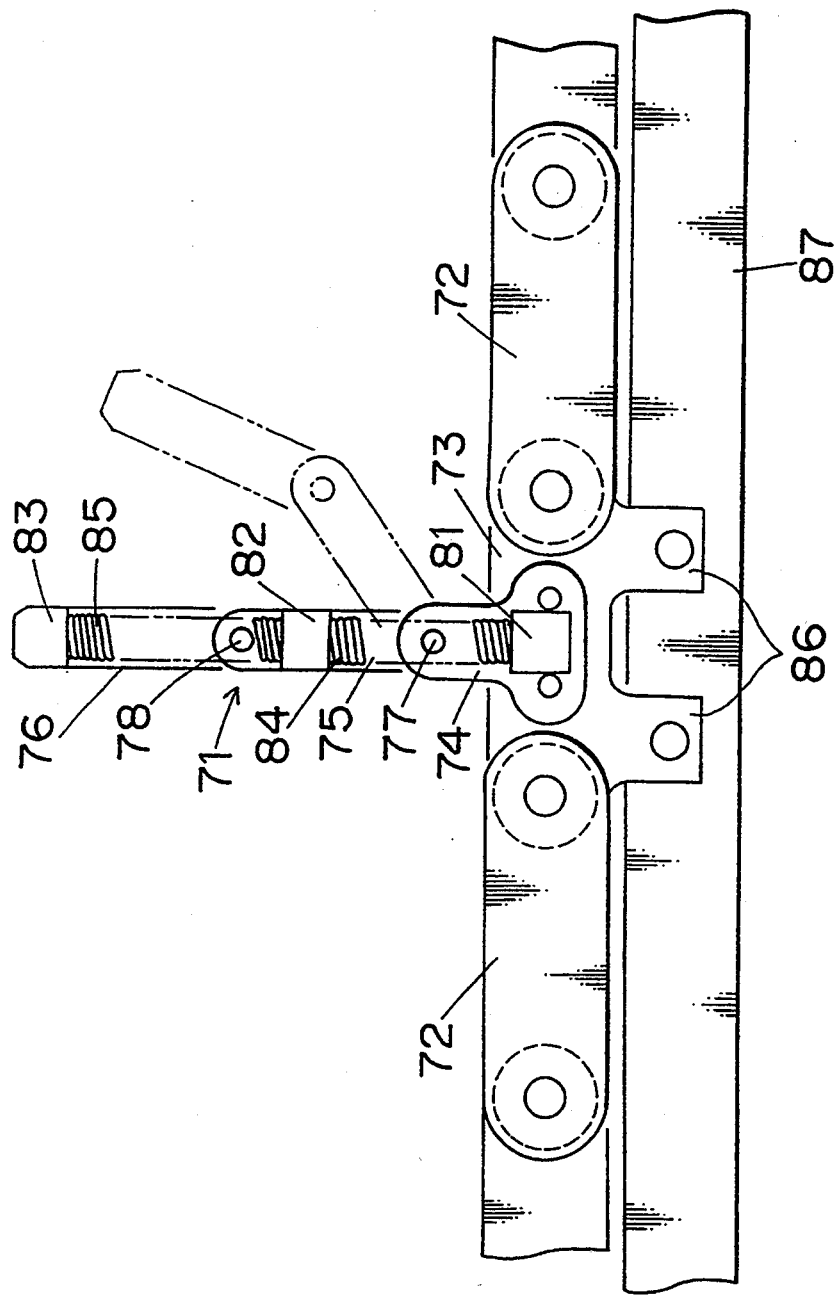

TOBACCO HARVERTER

BACKGROUND OF THE INVENTION

1. Field of the Invention

This invention relates to a tobacco harvester for automatically harvesting only tobacco leaves, and more particularly to a tobacco harvester in which leaf stripping claws of leaf stripping chains descend along a stem of a tobacco plant to strip down the tobacco leaves and transporting conveyors transport the tobacco leaves to a storage section.

2. Description of the Prior Art

In a conventional tobacco harvesting method, only tobacco leaves are harvested with stems of a tobacco plant being left as they are. Many types of such automatic tobacco harvesters are well known and an exemplary one of the tobacco harvesters comprises a movable main body, a pair of leaf stripping chains arranged on right and left sides of the main body, which travel in the direction parallel to traveling direction of the main body, and a plurality of leaf stripping claws projecting from the leaf stripping chains.

The leaf stripping chains have the same traveling velocity as that of the main body and travel in the opposite direction to that of the main body. Therefore, when a tobacco plant passes between the leaf stripping chains, the leaf stripping chains and leaf stripping claws relatively stop with respect to the tobacco stems in the direction that the main body travels.

Further, the leaf stripping chains are mounted so as to be inclined with a front portion thereof being higher than a rear portion thereof, which means an end of the leaf stripping chains on a front portion side of the main body is higher than the other end thereof. As a result, the leaf stripping claws attached to the leaf stripping chains descend along the stem of the tobacco plant, which permits only tobacco leaves to be separated from the stem. The tobacco harvesters as described above are disclosed in Japanese patent applications of which numbers Kokai Heisei 3-80015 and Kokai Heisei 3-251113.

SUMMARY OF THE INVENTION

With the conventional tobacco harvester described above, however, the tobacco leaves which are separated from the stem drop directly to a reservoir, which makes it difficult to securely harvest the tobacco leaves in the reservoir. Further, the stems of a tobacco plant are more or less bent or inclined, preventing the tobacco leaves from being securely separated from the stem.

It is therefore the object of the present invention to provide a tobacco harvester in which tobacco leaves are separated from stems of a tobacco plant and are securely transported to a storage section.

In order to solve the problem described above, the object of the present invention is to provide a tobacco harvester comprising: a movable main body; a harvesting mechanism mounted on the main body for harvesting tobacco leaves while the main body travels, the harvesting mechanism comprising, a pair of leaf transporting mechanisms which oppose each other with a clearance through which a stem of a tobacco plant passes, the leaf transporting mechanisms arranged on right and left sides of the main body and having leaf transporting rollers and endless conveyor belts disposed below the leaf transporting rollers which oppose each other and travel transversely to the main body, and leaf stripping chains disposed so as to oppose the pair of leaf transporting mechanisms and over the leaf transporting mechanisms with an end of the leaf stripping chains on a front portion side of the main body being higher, the leaf stripping chains having leaf stripping claws which project from the leaf stripping chains and travel in the reverse direction to that of the main body at portions opposing the leaf transporting mechanisms; and a storage section mounted on the main body for storing the tobacco leaves harvested by the harvesting mechanism.

In the tobacco harvester according to the present invention, the main body travels at a predetermined speed and the leaf stripping rollers and the conveyor belts of the leaf transporting mechanisms travel in the reverse direction to each other. Further, the leaf stripping chains travel at the same speed as that of the main body in the reverse direction to the main body. As a result, the leaf stripping chains and claws stop relatively with respect to the stems of the tobacco plant in the direction that the main body travels. In addition, the leaf stripping chains are inclined with an end of the chains each on a front portion side of the main body being higher, which permits the leaf stripping claws to descend with respect to the stems of the tobacco plant. As a result, the tobacco leaves are stripped and separated from the stems by the leaf stripping claws and chains.

The separated tobacco leaves are transported to the storage section through conveyor belts. A part of the tobacco leaves which are separated at the rear portion of the conveyor belts are transported to the storage section while the tobacco leaves are being put between the leaf transporting rollers and the conveyor belts. Then, the tobacco leaves are stored in the storage section.

BRIEF DESCRIPTION OF THE DRAWINGS

The present invention will be more apparent from the following description with reference to the accompanying drawings wherein:

FIG. 7 is a plan view taken along the line 7—7 of FIG. 6.

DETAILED DESCRIPTION OF PREFERRED EMBODIMENTS

Figure 1:
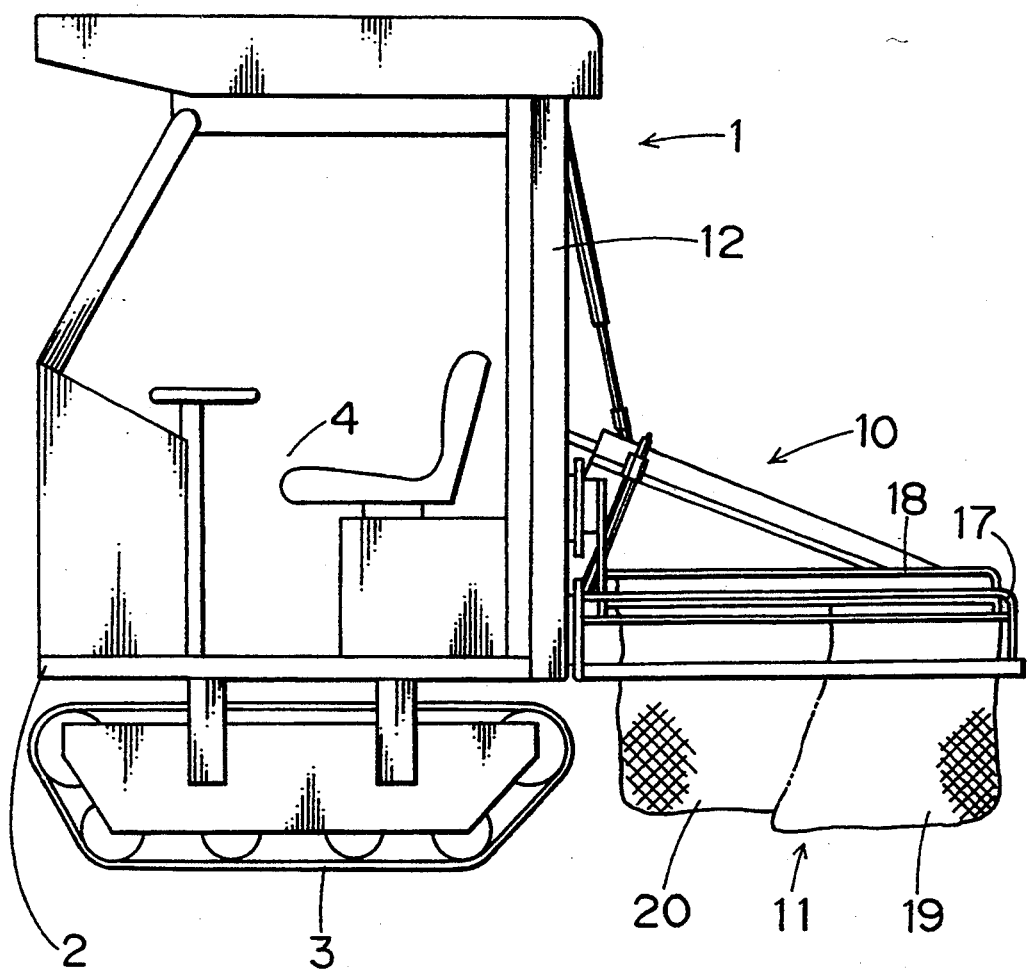
FIG. 1 is a side view of a tobacco harvester according to an embodiment of the present invention.
Figure 2:
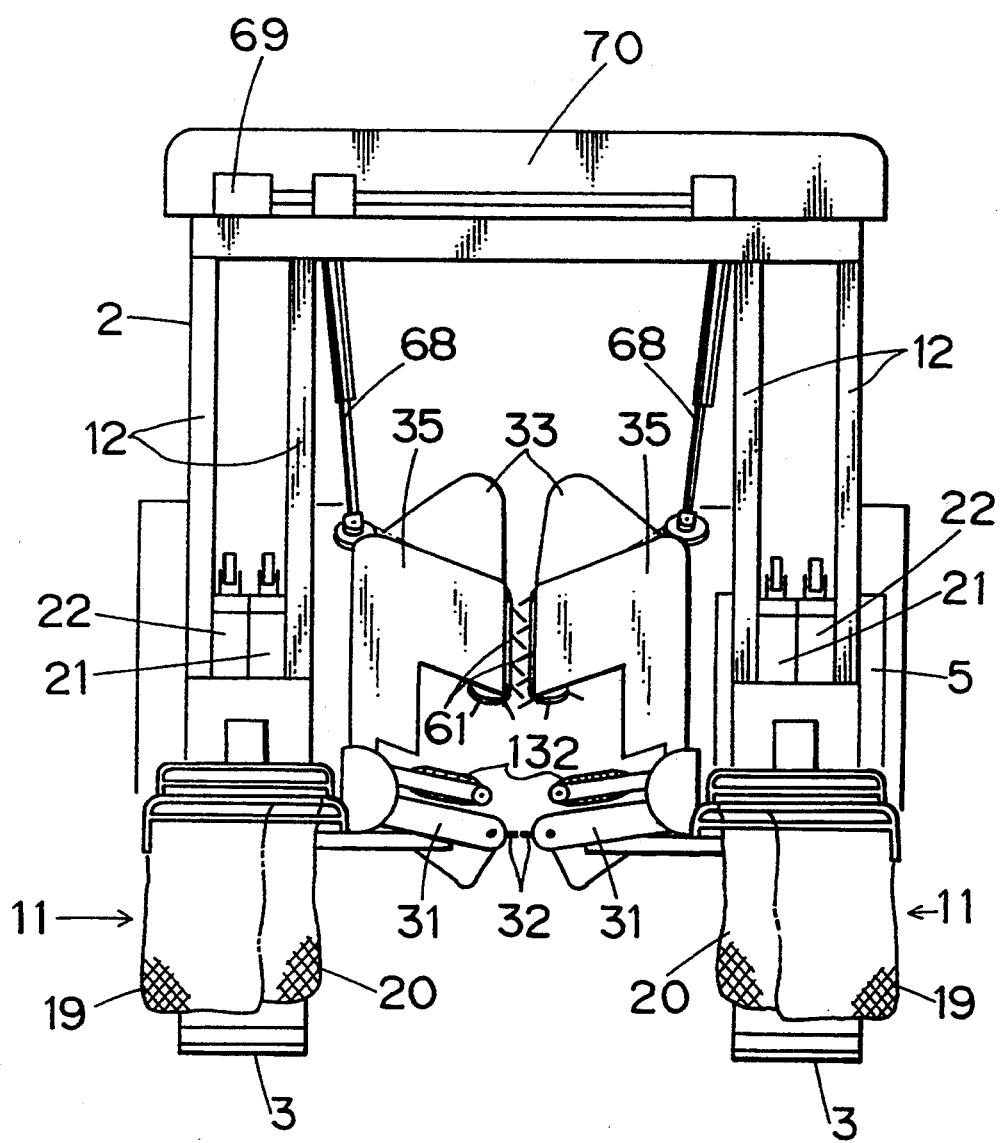
FIG. 2 is a Pear view of the tobacco harvester according to the embodiment.

FIG. 1 is a side view of a tobacco harvester according to an embodiment of the present invention and FIG. 2 is a rear view of the tobacco harvester. In the figures, denoted 1 is a main body of the tobacco harvester. The main body 1 has a frame 2, which has a shape of a gate as a whole. Further, the frame 2 is provided with a pair of traveling mechanisms such as crawlers 3 on right and left sides of the main body.

Further, the frame 2 is provided with a driver's seat 4 at one side, for example, a left side thereof, and is provided with a driving unit 5 such an engine and a hydraulic pump at the other side, for instance, right side of the frame.

The main body travels while straddling a ridge of tobacco plantation and tobacco plants pass through the frame 2 having a shape of a gate. At a rear portion of the main body 1 is provided a harvesting mechanism 10 for separating tobacco leaves from a stem of the tobacco plant, and a storage section 11 for storing the separated tobacco leaves.

Figure 3:
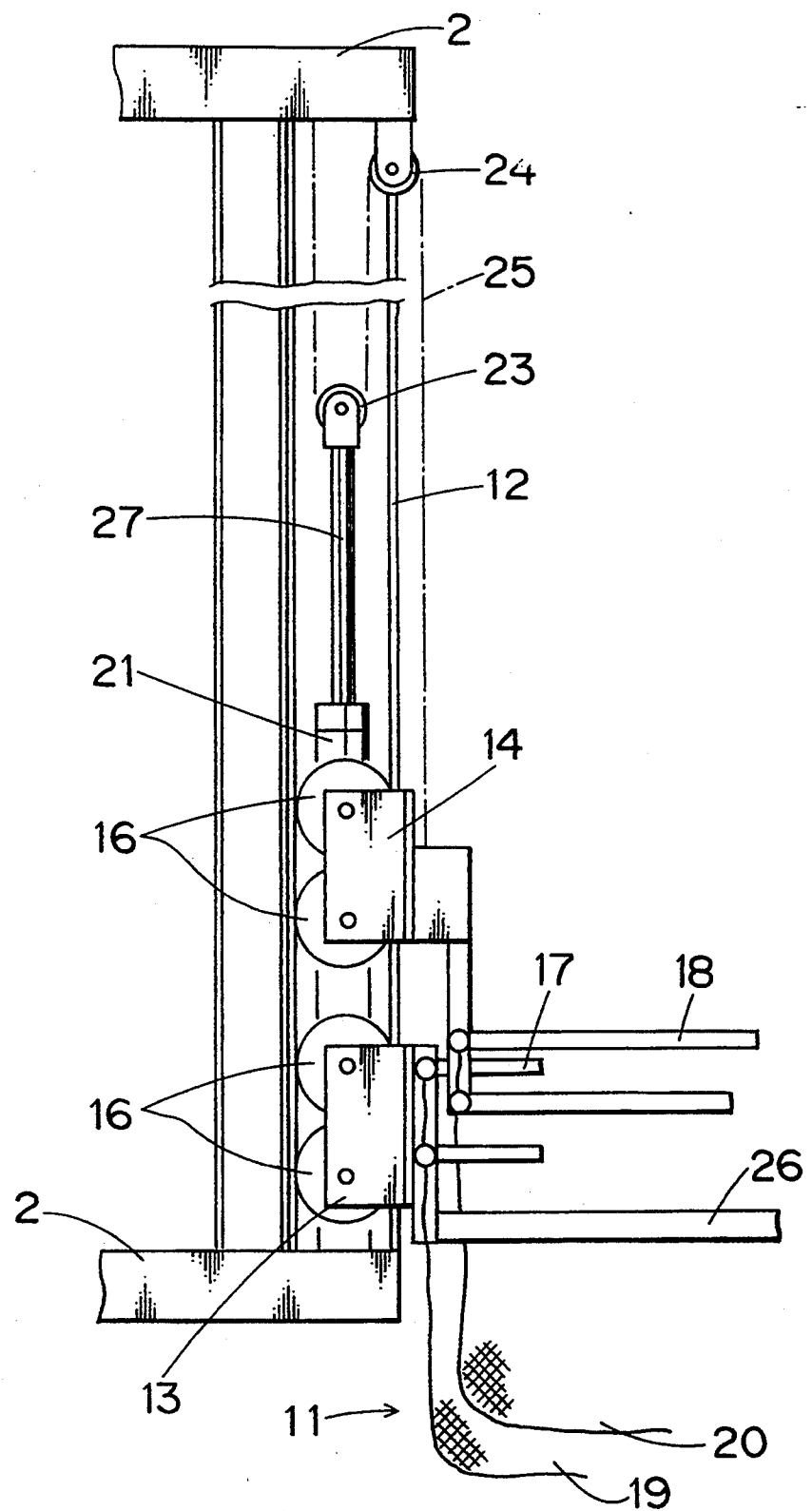
FIG. 3 is a side view of an elevation mechanism of harvesting bags and harvesting mechanism of the tobacco harvester according to the embodiment.

At first, the structure of the harvesting portion will be explained with reference to FIGS. 2 and 3. As illustrated in the figures, at rear portion of the frame 2 is disposed a pair of rails 12 on right and left sides of the rear portion. These Pails 12 consist of U-shaped steel and oppose each other.

Further, these right and left rails 12 are each provided with two guide trucks 13 and 14, which are vertically arranged. To each of the guide trucks 13 and 14 are attached four rollers 16, which are engaged with the rails 12. As a result, these guide trucks 13 and 14 are guided by the rollers 16 so that the guide trucks 13 and 14 vertically move along the rails 12. Further, lower guide trucks 13 each is provided with a mounting member 26, which projects rearwardly. To the mounting members 26 are attached the harvesting mechanism 10.

Further, the lower guide truck 13 and the upper guide truck 14 each is provided with mounting frames and 18, to which detachably attached are harvesting bags 19 and 20. The lower mounting frame 17 and the harvesting bag 19 described above are made so as to be larger than the upper mounting frame 18 and harvesting bag 20, which permits the upper mounting frame 18 and harvesting bag 20 to be accommodated in the lower mounting frame and harvesting bag 19 respectively.

Between the right and left rails 12 are disposed elevating cylinders 21 and 22, which independently raise or lower the lower guide truck 13 and the upper guide truck 14 respectively. Each of the elevating cylinders is provided with a piston rod 27 and with a pulley 23 at an end portion thereof. At upper portions of the frame 2 are provided pulleys 24 corresponding to the pulleys 23.

An end portion of elevating chains 25 each is attached to the upper portion of the frame 2 and is guided by the above pulleys 23 and 24. The other ends of the elevating chains 25 are attached to the guide trucks 13 and 14 respectively.

Therefore, the elevating chains 25 are drawn according to the stretch of the piston rods 27 of the elevating cylinders 21 and 22, so that the guide trucks 13 and 14 rise and fall. The elevating chains 25 are guided by the pulleys 23 of the piston rods 27 described above, allowing the guide trucks 13 and 14 each to rise and fall along a path twice the length of the stretch of the piston rods 27.

The storage section 11 consists of harvesting bags 20 and 19 which are vertically overlapped with each other. Therefore, when the upper harvesting bag 20 becomes full, the upper guide truck 14 is elevated to store the harvested tobacco leaves in the lower harvesting bag 19. After the main body passes through the ridge, unfastening a zipper at a bottom of the upper harvesting bag 20 allows the tobacco leaves stored in the upper harvesting bag 20 to drop in the lower harvesting bag 19.

Then, only the lower harvesting bag 19 is replaced. After the zipper is fastened, the upper harvesting bag 20 descends in the lower harvesting bag 19 and harvesting work continues at the next ridge.

Next, the structure of the harvesting mechanism will be explained with reference to FIGS. 4 to 7. The harvesting mechanism 10 is provided with a cover frame 35 and a leaf transporting mechanism 30 on right and left sides of the main body 1. The leaf transporting mechanisms 30 each comprises a conveyor 31 and a leaf transporting roller 132.

To the conveyor 31 is rotatably attached slender pulleys 51 and 52 and between those pulleys are mounted endless conveyor belts 53. The pulley 52 is driven by a hydraulic motor not shown and is designed to rotate in the direction as indicated by an arrow A. Brushes 32 are fixed to a portion where the conveyors 31 oppose each other in such a manner that the brushes oppose each other and the stem of the tobacco plant passes between the brushes 32.

The leaf transporting roller 132 is rotatably supported by a U-shaped rod 89 which is fixed to the mounting member 26 and the roller 132 is connected to a fixed shaft of a pulley 92, which is connected to a motor 91, by way of an universal joint 93. Further, the leaf transporting roller 132 is rotated by the rotation of the motor 91 in the reverse direction to the rotation of the conveyor belts 53 as indicated by an arrow B in the figure, a part of the stripped tobacco leaves is guided to the harvesting bags 19 and 20 in such a manner as to be put between the leaf transporting roller 132 and the conveyor belt 53. Further, rollers not shown having the same shape as the leaf transporting rollers 132 may be installed in the direction that the main body travels and over the conveyor 31 on the pulley 52 side.

Figure 4:
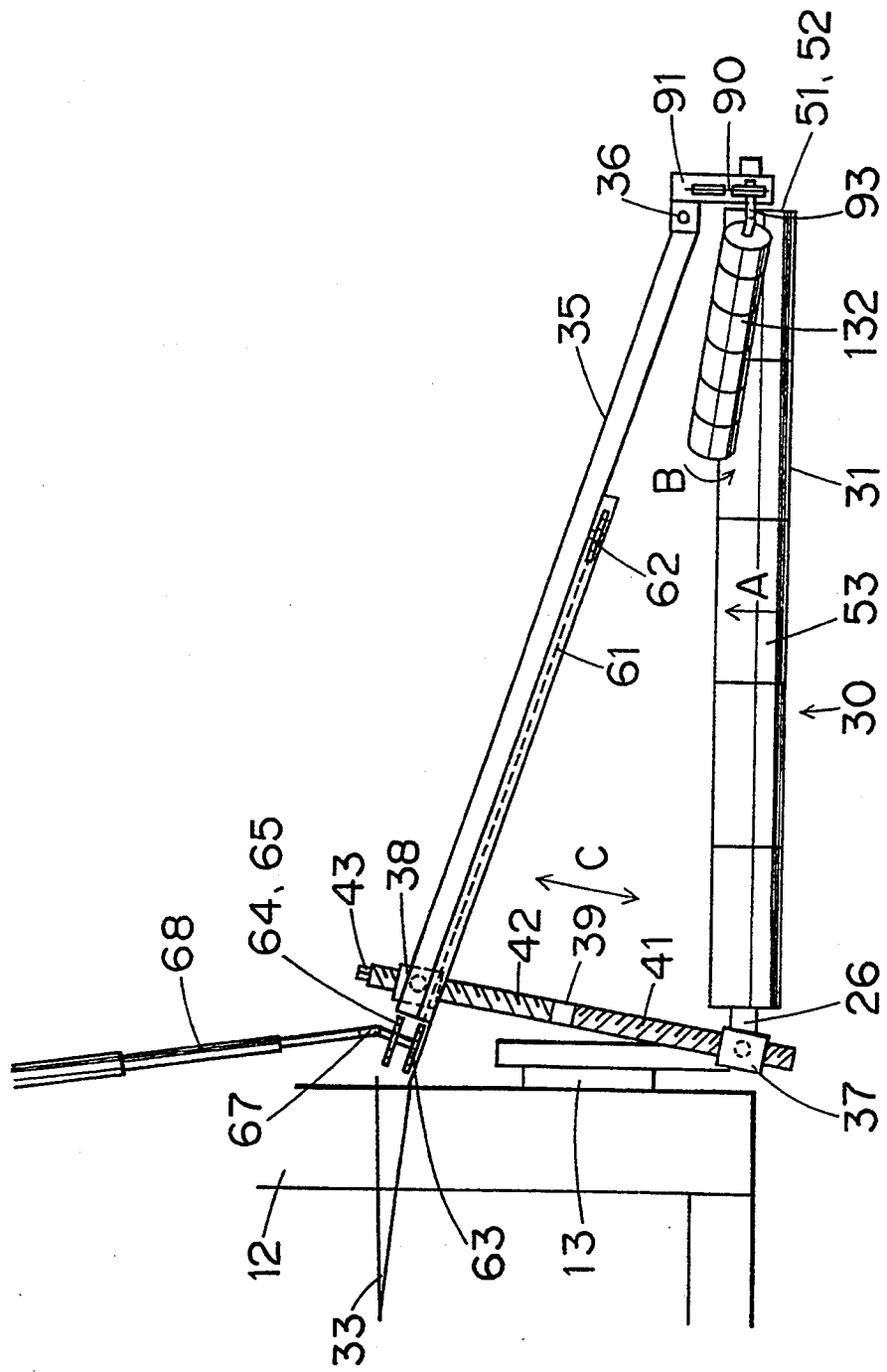
FIG. 4 is a side view showing the harvesting mechanism of the tobacco harvester according to the embodiment.
Figure 5:
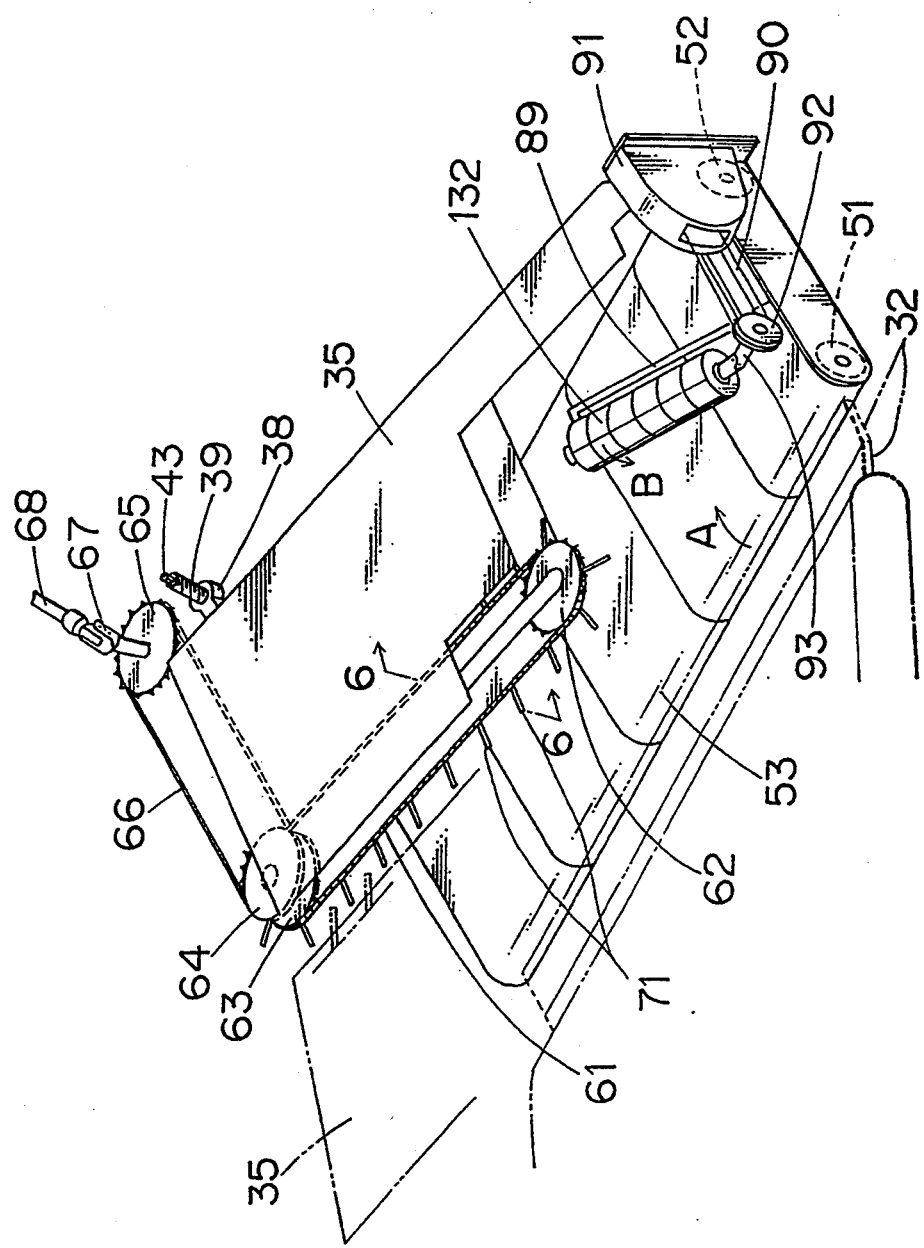
FIG. 5 is a perspective view showing the structure of conveyors, leaf transporting rollers and leaf stripping chains.
Figure 6:
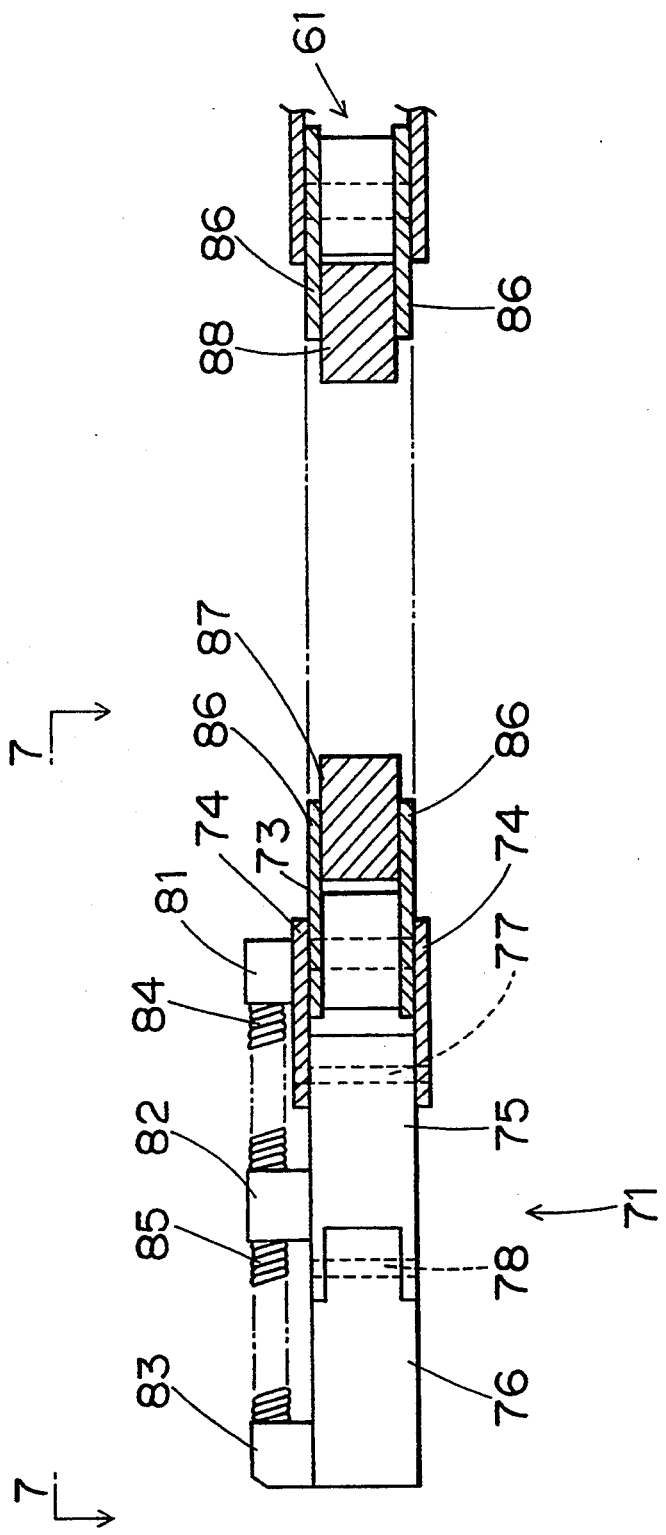
FIG. 6 is a cross-sectional view taken along the line 6—6 of FIG. 5.

As illustrated in FIG. 4, a rear end of the cover frame 35 is fixed to a shaft 36 at a rear end of the mounting member 26 and is able to be inclined with a front portion thereof being higher than a rear portion thereof.

Further, the front portion of the cover frame 35 is supported by a inclined adjusting mechanism, which comprises a nut 37 attached to the mounting member 26, another nut 38 fixed to the cover frame, and a screw rod 39 to which the nuts 37 and 38 are mounted. A right-handed screw portion 42 and a left-handed screw portion 41 are formed on the screw rod 39 and those screw portions are engaged with the nuts 38 and 37.

Therefore, a hexagon head portion 43 formed on the upper portion of the screw rod 39 is rotated by a spanner or the like to make the distance between the nuts 37 and 38 long or short, which allow the inclination of the cover frame 35 to be changed.

Further, from the front portion of the cover frame 85 is projected a substantially triangular guide frame 33, which introduces the stem of the tobacco plant between the right and left leaf transporting mechanism 80.

The cover frame 35 is provided with a leaf stripping chain 61 at each opposing edge of the pair of cover frames 35. The structure of the leaf stripping chain 61 will be explained below with reference to FIGS. 5 to 7. As described in the figures, sprockets 62 and 63 are substantially horizontally mounted in the vicinity of an end of the cover frame 35 in the direction that the tobacco leaves are transported. Between the sprockets 62 and 63 is mounted an endless leaf stripping chain 61.

A driving sprocket 64 is integrally formed with the sprocket 63 and another driving sprocket 65 is mounted so as to be engaged with the driving sprocket 64 through a driving chain 66. The driving sprocket 65 is connected to a driving shaft 68 through the universal joint 67. The right and left leaf stripping chains 61 are synchronously driven through the driving shaft 68, the driving mechanism mounted at the upper portion of the frame 2 shown in FIG. 2, and hydraulic motor 69. The traveling velocity of the leaf stripping chains 61 is controlled so as to correspond to that of the main body 1.

Leaf stripping claws 71 project from the leaf stripping chains 61 at predetermined intervals. The links 73 of the leaf stripping chains 61, which are disposed at predetermined intervals, have brackets 74 attached thereto, and the leaf stripping claws 71 are attached to the brackets 74. The leaf stripping claw 71 is divided into two portions such as a base member 75 and a tip member 76. The base member 75 is horizontally rotatably mounted on the bracket 75 with a pin 77. Further, the tip member 76 is horizontally rotatably attached to the base member 75 with a pin 78.

The bracket 74, the base member 75, and the tip member 76 are welded to blocks 81, 82, and 83, respectively. Among the blocks are mounted coil springs 84 and 85. Therefore, the base member 75 and the tip member are urged by the resilience of the coil springs 84 and 85 so as to be aligned on a line. Further, in case that the leaf stripping claws abut the stem of the tobacco plant, the coil springs 84 and 85 described above bend, which permits the leaf stripping claws to bend as indicated by a two-dot chain line in FIG. 7.

Guide claw portions 86 are integrally formed with the links 73 each. Along a portion adjacent to an edge of the cover frame 35, long and narrow guide rails 87 and 88 are mounted. The guide claw portions 86 are slidably engaged with lower and upper faces of the guide rails 87 and 88. As a result, the leaf stripping chains 61 are linearly guided by the guide rails 87 and 88.

Next, the working of the tobacco harvester with the above structure will be explained. The tobacco harvester travels along a ridge of tobacco plantation while the main body, having the shape of a gate, straddles the ridge. At the same time, the conveyor belts 53 of the leaf stripping mechanism and the leaf stripping rollers 132 are rotated in the opposite direction to each other. Further, the leaf stripping chains 61 travel at the same traveling speed as that of the main body 1.

The tobacco plant on the ridge of the tobacco plantation is guided along the guide plate 33 and is introduced into the right and left leaf transporting mechanism 30 to pass between the mechanism. In such a case, the leaf stripping chains 61 travels at the same velocity as the main body 1, so that the leaf stripping chains relatively stop with respect to the stem of the tobacco.

However, the leaf stripping chains are inclined with a front portion thereof being higher than rear portion thereof, the leaf stripping chains 61 drop with respect to the stem of the tobacco. As a result, the leaf stripping chains 61 and the leaf stripping claws 71, which project from the leaf stripping chains 61, descend adjacently to the tobacco plant along the stem thereof, which permits only the tobacco leaves to be stripped and separated from the tobacco stem. Since the leaf stripping claws can bend, even if the leaf stripping claw abuts the stem of the tobacco plant, the claw will bend to get free, which prevents the claw from being cut into the stem.

The separated tobacco leaves are transported under the cover frame 35 and outwardly right and left by the conveyor belts 53 to drop in the harvesting bags 19 and 20 for storage. A part of the separated tobacco leaves, which drop at a rear portion of the conveyor belts, are put between the conveyor belts 53 and the leaf transporting rollers 132 to securely be accommodated in the harvesting bags 19 and 20 through the rotating force of the leaf transporting rollers 132 and the conveyor belts 53.

As described above, in the tobacco harvester according to the present invention, the leaf stripping chains are mounted so as to be inclined with a front portion thereof being higher than a rear portion thereof and travel at the same velocity as that of the main body. Therefore, the leaf stripping chains relatively stop with respect to the tobacco plant and descend along the stem thereof, so that the tobacco leaves are stripped by the leaf stripping claws and are separated from the stem. Further, the separated tobacco leaves are transported through the conveyors of the tobacco leaves transporting mechanisms to the harvesting portion. A part of the separated tobacco leaves, which drop at rear portion, are put between the leaf transporting rollers and the conveyor belts to be securely transported to the storage portion.

As a result, the tobacco leaves are stripped from the stem of the tobacco plant and the separated tobacco leaves are securely transported to the storage portion by the leaf transporting mechanisms.

What is claimed is:

1. A tobacco harvester comprising:
   a movable main body;
   a harvesting mechanism mounted on said main body for harvesting tobacco leaves while said main body travels in a traveling direction, said harvesting mechanism comprising,
   a pair of leaf transporting mechanisms which oppose each other with a clearance through which a stem of a tobacco plant passes, said leaf transporting mechanisms being arranged on right and left sides of said main body and having leaf transporting rollers disposed above endless conveyor belts which have forward and rearward sides relative to the travel direction, the leaf transporting rollers being located at the rearward side of the endless conveyor belts, the conveyor belts being opposed to each other and traveling transversely to said main body, and
   leaf stripping chains disposed above and opposing said pair of leaf transporting mechanisms with an end of said leaf stripping chains on a front portion side of said main body being higher than the end of the leaf stripping chains on a rear portion side of said main body, said leaf stripping chains having leaf stripping claws which project from said leaf stripping chains and travel in the reverse direction to that of said main body at portions opposing said leaf transporting mechanisms; and
   a storage section mounted on said main body for storing said tobacco leaves harvested by said harvesting mechanism;
   wherein said endless conveyor belts are driven between two pulleys with parallel axes and wherein each of said leaf transporting rollers rotate about an axis which is non-parallel with respect to said axes of said two pulleys.

2. The tobacco harvester as in claim 1, wherein said leaf stripping chains are mounted on a pair of cover frames which are disposed over the endless conveyor belts, and the inclination of said cover frames is changeable with a front portion of said cover frames and further wherein the front portion of each of said cover frames is higher than a rear portion thereof.

3. The tobacco harvester as in claim 1, wherein a brush is attached adjacent a portion of each of said endless conveyor belts where said endless conveyor belts oppose each other, and said brushes have a clearance between each other so that a stem of a tobacco plant passes through.

4. A tobacco harvester as claimed in claim 1, wherein said leaf transporting rollers are supported on said endless conveyor belts by supporting means which are fixed to a supporting member of the main body.

5. The tobacco harvester as in claim 1, wherein said storage section comprises:

a pair of rails vertically mounted on right and left sides of the main body;
upper and lower guide trucks mounted on each of said pair of rails;
upper and lower mounting frames attached to each of said upper and lower guide trucks; and
upper and lower harvesting bags fixed to each of said upper and lower mounting frames,
wherein said lower mounting frames and harvesting bags are larger than said upper mounting frames and harvesting bags.

6. The tobacco harvester as in claim 1, wherein said leaf transporting rollers are positively driven by a motor.

* * * * *